United States Patent Office 3,806,475
Patented Apr. 23, 1974

3,806,475
UNSYMMETRICAL TRAZINE CATALYSTS FOR
PREPARING CELLULAR FOAMS
Thirumurti L. Narayan, Riverview, Moses Cenker, Trenton, Peter T. Kan, Plymouth, and John T. Patton, Jr., Wyandotte, Mich., assignors to BASF Wyandotte Corporation, Wyandotte, Mich.
No Drawing. Filed Dec. 29, 1972, Ser. No. 319,559
Int. Cl. C08g 33/02, 33/04
U.S. Cl. 260—2.5 BF       17 Claims

ABSTRACT OF THE DISCLOSURE

Rigid cellular foam products are prepared by condensing an organic polyisocyanate in the presence of a catalytically sufficient amount of an unsymmetrical triazine corresponding to the formula:

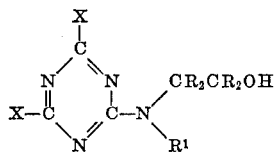

wherein R is hydrogen or lower alkyl, $R^1$ is $CR_2CR_2OH$ or lower alkyl, X is $NR_2$

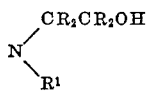

alkoxy, aryloxy, alkyl, aryl, hydroxyl, halogen, aziridyl, pyrrolidyl, piperidyl, or N-alkylpiperazyl with the proviso that each X cannot be

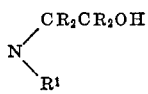

wherein each R and $R^1$ is the same.

BACKGROUND OF THE INVENTION

(1) Field of the invention

The present invention pertains to rigid cellular foams having excellent flame-retardant properties. More particularly, the present invention concerns the preparation of rigid foams characterized by a combination of carbodiimide linkages, isocyanurate linkages, and isocyanate linkages, and, in particular, the preparation of such foams by the catalytic condensation of an organic polyisocyanate in the presence of unsymmetrical triazine catalysts.

(2) Prior art

In copending U.S. patent application Ser. Nos. 5,985, filed Jan. 26, 1970, now U.S. 3,645,923 and 118,994, filed Feb. 25, 1971, there is disclosed the preparation of rigid cellular foams characterized by carbodiimide linkages by the catalytic condensation of an organic polyisocyanate in the presence of certain triazine catalysts. In the former application the disclosed catalysts are 2,4,6-tris(dialkanolamino)-s-triazines. In the latter application the disclosed catalysts are 2,4,6-tris(N - methylethanolamino)-s-triazines. Heretofore, it was believed that only symmetrically substituted triazines could function as useful catalysts for the condensation reaction, thus, limiting the selection of useful catalysts.

The present invention is based on the discovery that unsymmetrically substituted triazines are useful in preparing rigid foams characterized by carbodiimide linkages.

SUMMARY OF THE INVENTION

In accordance with the present invention rigid cellular foams characterized by carbodiimide, isocyanurate and isocyanate linkages are prepared by the condensation reaction of an organic polyisocyanate in the presence of a catalytically sufficient amount of an unsymmetrically substituted triazine.

The triazines contemplated herein generally correspond to the formula:

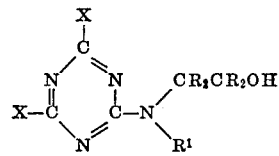

wherein R is hydrogen or lower alkyl of from 1 to 10 carbon atoms, $R^1$ is $CR_2CR_2OH$ or lower alkyl of from 1 to 12 carbon atoms, X is $NR_2$,

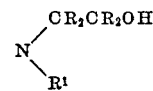

alkoxy of from 1 to 12 carbon atoms, aryloxy of from 6 to 12 carbon atoms, alkyl of from 1 to 12 carbon atoms, aryl of from 6 to 12 carbon atoms, hydroxyl, halogen, aziridyl, pyrrolidyl, piperidyl, or N-alkylpiperazyl. Since the triazines are unsymmetrically substituted, it is apparent that each X cannot concurrently be

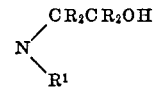

wherein each R and $R^1$ is the same.

More a more comprehensive discussion of the present invention, reference is made to the following detailed description and examples.

DESCRIPTION OF THE PREFERRED EMBODIMENTS

The present invention, as noted, generally provides for the preparation of rigid cellular foams characterized by carbodiimide, isocyanurate and isocyanurate groups by the catalytic condensation of an organic polyisocyanate in the presence of a catalytically sufficient amount of an unsymmetrically substituted triazine.

(A) The catalysts

The unsymmetrically substituted triazines which are embodied by the present invention are generally structurally designated as:

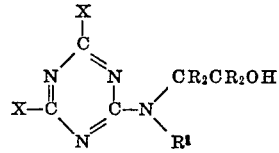

wherein R is hydrogen or lower alkyl, $R^1$ is hydrogen or $CR_2CR_2OH$, X is individually $NR_2$

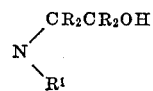

alkoxy, aryloxy, alkyl, aryl, hydroxyl, halogen, aziridyl, pyrrolidyl, piperidyl, and N-alkylpiperazyl. It is evident from the compositions defined herein that each X cannot simultaneously be

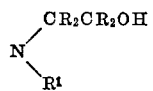

wherein each R and $R^1$ is identical, lest the product be symmetrically substituted.

Representative compounds falling within the above generic formula include:

2-amino-4,6-bis(N-methyl-2-hydroxyethylamino)-1,3,5-triazine,
2,4-bis(N-methyl-2-hydroxyethylamino)-6-methoxy-1,3,5-triazine,
2,4-bis(di-2-hydroxyethylamino)-6-chloro-1,3,5-triazine,
2,4-bis(N-methyl-2-hydroxyethylamino)-6-chloro-1,3,5-triazine,
2,4-bis(N-methyl-2-hydroxyethylamino)-6-phenyl-1,3,5-triazine,
2,4-bis(N-methyl-2-hydroxyethylamino)-6-diethylamino-1,3,5-triazine,
2,4-bis(N-methyl-2-hydroxyethylamino)-6-dimethylamino-1,3,5-triazine.
2,4-bis(di-2-hydroxyethylamino)-6-diethylamino-1,3,5-triazine,
2,4-bis(di-2-hydroxyethylamino)-6-phenoxy-1,3,5-triazine,
2,4-bis(N-methyl-2-hydroxyethylamino)-6-phenoxy-1,3,5-triazine,
2,4-bis(N-methyl-2-hydroxyethylamino)-6-methyl-1,3,5-triazine,
2,4-bis(di-2-hydroxyethylamino)-6-methyl-1,3,5-triazine,
2,4-bis(N-methyl-2-hydroxyethylamino)-6-hydroxy-1,3,5-triazine,
2,4-bis(diethylamino)-6-(N-methyl-2-hydroxyethylamino)-1,3,5-triazine.
2,4-dimethoxy-6-(N-methyl-2-hydroxyethylamino)-1,3,5-triazine,
2,4-bis(dimethylamino)-6-(N-methyl-2-hydroxyethylamino)-1,3,5-triazine,
2,4-diphenoxy-6-(N-methyl-2-hydroxyethylamino)-1,3,5-triazine, and
2,4-diphenoxy-6-(di-2-hydroxyethylamino)-1,3,5-triazine.

It should be noted that within this list of representative compounds there is defined certain new compositions of matter. These new compositions can be structurally defined as:

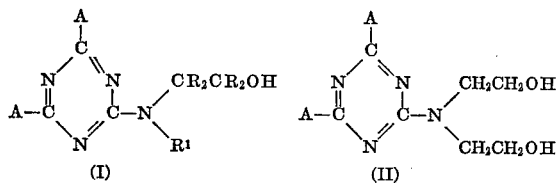

wherein R is hydrogen or lower alkyl of from 1 to 10 carbon atoms, $R^1$ is either lower alkyl of from 1 to 12 carbon atoms or hydroxyalkyl having from 3 to 12 carbon atoms and A is alkoxy, aryloxy, alkyl, aryl or $NR_2''$ wherein $R''$ is lower alkyl having from 1 to 5 carbon atoms. Exemplifying these new compounds are:

2,4-bis(diethylamino)-6-(N-methyl-2-hydroxyethylamino)-1,3,5-triazine,
2,4-dimethoxy-6-(di-2-hydroxyethylamino)-1,3,5-triazine,
2,4-bis(dimethylamino)-6-N-methyl-2-hydroxyethylamino)-1,3,5-triazine,
2,4-diphenoxy-6-(N-methyl-2-hydroxyethylamino)-1,3,5-triazine, and
2,4-diphenoxy-6-(di-2-hydroxypropylamino)-1,3,5-triazine.

These new compositions of matter are more particularly detailed in copending U.S. patent applications Ser. No. 319,930, entitled "Unsymmetrically - Substituted - S - Triazines" and Ser. No. 319,906, entitled "Distributed Diethanolamino-S-Triazines," both filed on even date herewith. The other triazines are known as illustrated by U.S. Pat. No. 3,573,301.

Generally, all of the unsymmetrically substituted triazines contemplated for use herein can be prepared by either of two procedures. The first of such procedures is one well known to the skilled artisan and is the one conventionally employed in the art. Generally, this procedure comprises reacting cyanuric chloride with a secondary amine in mole ratio equivalent to the number of chlorine atoms sought to be replaced. The resulting chlorotriazine is then separated from the reaction mixture and is then reacted with a different amine or chlorine-replaceable product again in a mole ratio equivalent to the number of chlorine atoms sought to be replaced. Thus, for example, 2,4-bis(dimethylamino)-6-(N-methyl-2-hydroxyethylamino)-1,3,5-triazine is prepared by reacting one mole of cyanuric chloride with two moles of dimethylamine to form 2,4-bis(dimethylamino)-6-chloro-1,3,5-triazine. This product is then separated out from the reaction mixture and a separate reaction is initiated between the 2,4-bis-(dimethylamino)-6-chloro-1,3,5-triazine and N-methyl-2-hydroxyethylamine in a 1:1 mole ratio to prepare the 2,4-bis(dimethylamino) - 6 - (N - methyl - 2 - hydroxyethylamino)-1,3,5-triazine. The first step of the reaction is generally conducted in an aqueous slurry of cyanuric chloride and in the presence of a hydrochloric acid reaction compound to neutralize the hydrochloric acid by-product at a temperature ranging from about 0° C. to 25° C. It should be noted that if two chlorine atoms are being replaced in the first stage, then the reaction is initially conducted at about 0° C. to 5° C. to replace one chlorine atom and at about 20° C. to 25° C. to replace the other chlorine atom. This is dictated by the nature of the reactivities of the three chlorine atoms in cyanuric chloride, as is known to those skilled in the art. The replacement of the third chlorine atom is also done in an aqueous slurry of the substituted cyanuric chloride and in the presence of a hydrochloric acid reactive compound generally at the reflux temperature of the reaction mixture. Because of the separation step of this process the yields of unsymmetrical triazine are inherently low, thereby rendering this process economically disadvantageous for the practice of the present invention. Again this step-wise procedure is well known in the art. See, for instance, D. W. Kaiser et al., J. Am. Chem. Soc., 73, 2984 (1951).

The second process for preparing the unsymmetrical triazines is more particularly detailed in the above-referred to copending U.S. patent application Ser. No. 319,931 filed on even date herewith and incorporated herein by reference thereto. This process generally comprises directly reacting all the substituents and eliminating the precursor or intermediate separation step.

(B) Foam formation

In accordance with the present invention, rigid cellular foams are prepared by the catalytic condensation of an organic polyisocyanate in the presence of a catalytically sufficient amount of an unsymmetrically substituted triazine catalyst as hereinbefore defined.

The products which are produced in accordance herewith are rigid cellular foam plastics containing carbodiimide linkages, isocyanurate linkages as well as isocyanate linkages. It is the carbodiimide linkages whose formation provides the carbon dioxide blowing agent and which imparts the excellent flame properties to the products.

The organic polyisocyanate used to prepare the carbodiimide foam corresponds to the formula:

wherein $R''$ is a polyvalent organic radical which is either aliphatic, aralkyl, alkaryl, aromatic or mixtures thereof, and z is an integer which corresponds to the valence of $R''$ and is at least two. Representative of the organic polyisocyanates contemplated herein includes, for example, the aromatic diisocyanates, such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4"-triphenylmethane triisocyanate, 2,4,6-toluene triisocyanates; the aromatic tetraisocyanates, such as 4,4'-dimethyldiphenylmethane-2,2'-5,5' - tetraisocyanate, and the like; arylalkyl polyisocyanates, such as xylylene diisocyanate; aliphatic polyisocyanates, such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenyl-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate.

These polyisocyanates are prepared by conventional methods known in the art such as the phosgenation of the corresponding organic amine.

Still another class of organic polyisocyanates contemplated for use herein are the so-called "quasi-prepolymers." These quasi-prepolymers are prepared by reacting an excess of organic polyisocyanate or mixtures thereof with a minor amount of an active hydrogen containing compound as determined by the well-known Zerewitinoff test, as described by Kohler in J. Am. Chem. Soc., 49, 3181 (1927). These compounds and their methods of preparation are well known in the art. The use of any one specific active hydrogen compound is not critical hereto, rather any such compound can be employed herein.

Suitable active hydrogen-containing groups as determined by the Zerewitinoff method which are reactive with an isocyanate group include —OH, —NH—, —COOH, and —SH. Examples of suitable types of organic compounds containing at least two active hydrogen-containing groups which are reactive with an isocyanate group are hydroxyl-terminated polyesters, polyalkylene ether polyols, hydroxyl-terminated polyurethane polymers, polyhydric polythioethers, alkylene oxide adducts of phosphorus-containing acids, polyacetals, aliphatic polyols, aliphatic thiols including alkane, alkene and alkyne thiols having two or more —SH groups; diamines including both aromatic, aliphatic and heterocyclic diamines, as well as mixtures thereof. Compounds which contain two or more different groups within the above-defined classes may also be ued in accordance with the process of the present invention such as, for example, amino alcohols which contain an amino group and a hydroxyl group. Also, compounds may be used which contain one —SH group and one —OH group as well as those which contain an amino group and a —SH group.

Any suitable hydroxyl-terminated polyester may be used such as are obtained, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexane-dicarboxylic acid. Any suitable polyhydric alcohol, including both aliphatic and aromatic, may be used such as ethylene glycol, 1,3-propylene glycol, 1,2-propylene glycol, 1,4-butylene glycol, 1,3-butylene glycol, 1,2-butylene glycol, 1,5-pentanediol, 1,4-pentanediol, 1,3-pentanediol, 1,6-hexanediol, 1,7-heptanediol, glycerol, 1,1,1-trimethylolpropane, 1,1,1-trimethylolethane, hexane-1,2,6-triol, α-methyl glucoside, pentaerythritol, and sorbitol. Also included within the term "polyhydric alcohol" are compounds derived from phenol such as 2,2-(4,4'-hydroxyphenol)propane, commonly known as Bisphenol A.

Any suitable polyalkylene ether polyol may be used such as the polymerization product of an alkylene oxide or of an alkylene oxide with a polyhydric alcohol. Any suitable polyhydric alcohol may be used such as those disclosed above for use in the preparation of the hydroxyl-terminated polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and Encyclopedia of Chemical Technology, vol. 7, pp. 257–262, published by Interscience Publishers, Inc. (1951) or in U.S. Pat. No. 1,922,459.

Any suitable polyhydric polythioether may be used such as, for example, the condensation product of thiodiglycol or the reaction product of a dihydric alcohol such as is disclosed above for the preparation of the hydroxyl-terminated polyesters with any other suitable thioether glycol.

The hydroxyl-terminated polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that made up the hydroxyl-terminated polyester with only a portion of the components being a diamine such as ethylene diamine.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable hydroxyl-terminated polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethanedithiol, 1,2-propanedithiol, 1,3-propanedithiol, and 1,6-hexanedithiol; alkenethiols such as 2-butene-1,4-dithiol; and alkynethiols such as 3-hexyne-1,6-dithiol.

Any suitable polyamine may be used including aromatic polyamines such as p-aminoaniline, 1,5-diaminonaphthalene, and 2,4-diaminotoluene; aliphatic polyamines such as ethylenediamine, 1,3-propylenediamine, 1,4-butylenediamine, and 1,3-butylenediamine, as well as substituted secondary derivatives thereof.

In the practice of the present invention, the preferred organic polyisocyanate is either crude toluene diisocyanate, toluene diisocyanate, methylene diphenyl diisocyanate, crude methylene diphenyl diisocyanate, or mixtures thereof.

The unsymmetrically substituted triazine can be used herein, alone or in admixture with an isocyanate trimerization catalyst. When used alone, the triazine is employed in an amount ranging from about 0.1 part to 20 parts, preferably from 0.5 part to 5 parts by weight, per one hundred parts by weight of organic polyisocyanate. In an admixture of triazine and isocyanate trimerization catalyst, there is employed a respective weight ratio of triazine to isocyanate trimerization catalyst of from about 0.1:10 to 10:0.1 and preferably from about 1:4 to 4:1. However, the total amount of catalyst admixture utilized will fall within the parameters defined for the triazine alone.

Useful isocyanate trimerization catalyst include, for example, 1,3,5-tris(N,N-dialkylaminoalkyl)-s-hexahydrotriazines; the alkylene oxide and water adducts of 1,3,5- tris(N,N - dialkylaminoalkyl)-s-hexahydrotriazines; 2,4,6-tris(dimethylaminomethyl)phenol; o-, p- or a mixture of o- and p-dimethylaminomethylphenol, certain organotin compounds and the like.

1,3,5-tris(N,N - dialkylaminoalkyl)-s-hexahydrotriazine compounds have heretofore been described as useful co-catalysts or isocyanate trimerization catalysts. See, for instance, copending U.S. patent application, Ser. No. 157,025, filed June 25, 1971, now U.S. 3,723,366, the disclosure of which is hereby incorporated by reference. Preferred within this group of hexahydrotriazine compounds is 1,3,5-tris(N,N - dimethyl-3-aminopropyl)-s-hexahydrotriazine.

The alkylene oxide and water adducts of a 1,3,5-tris-(N,N-dialkylaminoalkyl)-s-hexahydrotriazine is presumably a quaternary ammonium hydroxide. These compounds are generally prepared by reacting equimolar amounts of the hexahydrotriazine, alkylene oxide and water at a temperature of from about 10° C. to 80° C. for a period of from about five minutes to two hours. Preferred within this group of compounds is the propylene oxide and water adduct of 1,3,5-tris(N,N-dimethyl-3-aminopropyl)-s-hexahydrotriazine.

2,4,6-tris(dimethylaminomethyl)phenol as well as o-, p- and a mixture of o- and p-(dimethylaminomethyl) phenol are known compounds which are commercially available products sold by Rohm & Haas under the trade names DMP-30 and DMP-10.

The organotin compounds which are useful as isocyanate trimerization compounds are more particularly described in U.S. Pat. No. 3,396,167, the disclosure of which is hereby incorporated by reference. Specifically, the preferred compounds are triorganotin alkoxides or bis(triorganotin)oxide and, in particular, tri-n-butyltin methoxide, bis(tri-n-butyltin)oxide or bis(triphenyltin)oxide.

With regard to the phenol-type and organotin-type isocyanate trimerization compounds, their use in the preparation of foams is more completely described in copending U.S. patent application Ser. No. 118,994, filed Feb. 25, 1971, the disclosure of which is also hereby incorporated by reference.

It is to be understood that hereinafter with reference to the term "catalyst" both the admixture of isocyanate trimerization catalyst and triazine as well as the triazine alone are included thereby.

The foams of the present invention are prepared by mixing together the organic polyisocyanate and the catalyst at an initiating temperature which, depending on the catalyst, will range from about 0° C. to 150° C. Under such conditions carbon dioxide is generated, foam formation begins, and almost immediately an exotherm is developed within the reaction system. Alternatively, the foams may be prepared by adding the catalyst to the polyisocyanate and when necessary heating the mixture to the initiation temperature or separately pre-heating the polyisocyanate and the catalyst, and then mixing the two together.

The present invention also contemplates the incorporation of additional ingredients in the foam formulation to tailor the properties thereof. Thus, plasticizers, such as tris(2-chloroethyl)phosphate; surfactants, such as the silicone surfactants, e.g., alkylpolysiloxanes and polyalkyl siloxanes; active hydrogen-containing compounds, such as those described above for preparing quasi-prepolymers, may be employed in the invention. Further additional ingredients include auxiliary or supplemental blowing agents, such as water or halohydrocarbons, as described in copending U.S. patent application Ser. No. 169,526, filed Aug. 5, 1971. Also, inorganic fillers, pigments and the like can be used.

In preparing the foams with additional ingredients and, in particular, with halohydrocarbon blowing agents, plasticizers and surfactants, it is preferred to facilitate handling that the halohydrocarbon be dissolved in the polyisocyanate prior to commencing reaction and the plasticizers and surfactants be preblended with the catalyst.

It should also be pointed out that in many instances the unsymmetrical triazine is a solid ambient conditions. Thus, it can be first dissolved in an inert solvent therefor, such as in an active hydrogen-containing compound, a plasticizer, a surfactant or blowing agent, thereby providing an easy means for introducing both ingredients into the system.

In any event the carbodiimide foams prepared in accordance herewith are rigid cellular products having a density of from about one to forthy pounds per cubic foot, which exhibit excellent flame properties, such as fire resistance, low smoke evolution and excellent weight retention.

Following are specific, non-limiting examples which are provided to illustrate the enumerated principles described herein. In the examples all parts are by weight unless otherwise indicated.

The following first fourteen examples illustrate the preparation of unsymmetrically substituted triazines by the conventional process employed in the art. In these examples, it will be noted that the first step of the process, i.e., the reaction of cyanuric chloride with the first chlorine-replaceable compound is omitted from Examples II–XIV because each of the intermediates or precursors used to prepare the unsymmetrically substituted triazine is a known composition of matter.

EXAMPLE I

A reaction vessel equipped with a reflux condenser, thermometer, addition funnel, and mechanical stirrer was charged with 600 parts of water and cooled to 0° C. Cyanuric chloride (184.5 parts) was then added portionwise maintaining the temperature of the reaction mixture below 5° C. Two moles (146.0 parts) of anhydrous diethylamine was then slowly added to the reaction mixture maintaining the temperature between 0° C.–5° C. Upon completion of the addition of the amine, a 50% aqueous potassium hydroxide solution (132 parts of KOH in 132 parts of water) was added to the charge over a period of 1.5 hours while maintaining the temperature below 50° C. After the addition was completed, the reaction mixture was maintained at 50° C. for two hours. One mole (75.0 parts) of N-methylethanolamine was then slowly added to the charge over a period of thirty minutes and the charge was heated to reflux temperature, about 100° C. After reaching reflux, 132 parts of a 50% aqueous solution of potassium hydroxide was added dropwise to the vessel over a period of about twenty minutes to neutralize the generated hydrochloric acid. The contents in the vessel were then refluxed for seventeen hours, after which time the reaction mixture was allowed to cool to room temperature. Thereafter, the organic layer was separated from the aqueous layer and was distilled to yield 251.1 parts of 2,4-bis(diethylamino)-6-(N-methyl-2-hydroxyethylamino)-1,3,5-triazine, a liquid product having a boiling point of 153° C. at 0.45 mm. of mercury.

EXAMPLE II

A reaction vessel equipped similarly to that used in Example I was charged with a slurry of 30.2 parts of (0.15 mole) of 2-chloro-4,6-bis(dimethylamino)-1,3,5-triazine. With agitation 11.3 parts (0.15 mole) of N-methylethanolamine was added dropwise to the slurry while maintaining the temperature in the vessel at about 45° C. After the addition was completed, 12 parts of a 50% aqueous solution of sodium hydroxide was added to the vessel at a rate sufficient to maintain the pH at between seven and eight. After the sodium hydroxide addition was completed, the contents of the vessel was heated to reflux (101° C.) and maintained thereat for five hours. The reaction mixture was then allowed to cool to room temperature and 33.8 parts of white, crystalline 2,4-bis(dimethylamino) - 6 - (N-methyl-2-hydroxyethylamino)-1,3,5-triazine precipitated. The product was collected by filtration, dried and recrystallized from petroleum ether.

EXAMPLE III

A reaction vessel equipped similar to that of Example I was charged with a slurry of 22.6 parts (0.1 mole) of 2,4-dichloro-6-phenyl-1,3,5-triazine in 125 parts of water. With vigorous agitation, 15 parts (0.2 mole) of N-methylethanolamine was added dropwise thereto over a period of about thirty minutes while maintaining the temperature between 0° C. and 5° C. After the addition was completed, the ice-bath was removed and the vessel was allowed to warm up to room temperature with continuing agitation. Then, 40.6 parts of a 26.1% aqueous solution of sodium carbonate was added to the vessel dropwise at a rate sufficient to maintain the pH between seven and eight while heating the contents of the vessel to reflux (102° C.). The reaction mixture was then refluxed for three and one-half hours and allowed to cool to room temperature. The viscous oil was separated from water, dissolved in boiling chloroform, dried and crystallized from petroleum ether. The yield of white crystalline 2,4-bis(N-methyl-2-hydroxyethylamino) - 6-phenyl-1,3,5-triazine was 24.6 parts (melting point of 88° C.–90° C.). Infrared and proton magnetic resonance spectra are consistent with the structure of the product.

EXAMPLE IV

At room temperature into a reaction vessel equipped similar to that of Example I and including heating means was added a slurry of 44.2 parts (0.2 mole) of 2,4-dichloro-6-diethylamino-1,3,5-triazine in 200 parts of water. Thirty parts (0.4 mole) of N-methylethanolamine was then added thereto with stirring. While continuously stirring, the temperature in the vessel was slowly increased and simultaneously 81.6 parts of a 26.5% aqueous solution of sodium carbonate was added dropwise thereto at a rate sufficient to maintain the pH between seven and eight. After four hours, the addition was completed and the temperature in the vessel was 100° C., the reflux temperature. The reaction mixture was then refluxed for an additional hour, allowed to cool to room temperature and the oily layer was separated out to yield 44.3 parts of crude 2,4-bis(N-methyl-2-hydroxyethylamino)-6-diethylamino-1,3,5-triazine which was then purified by fractional distillation at a boiling point of 177° C. at 0.15 mm. of mercury.

EXAMPLE V

The procedure of Example IV was repeated using 27.3 parts (0.26 mole) of diethanolamine, 29 parts (0.13 mole) of 2,4-dichloro-6-diethylamino-1,3,5-triazine and 13.8 parts of a 26.5% aqueous solution of sodium carbonate. The sodium carbonate addition took three hours and the reaction mixture was refluxed for three hours. The oily product was separated from the water and crystallized from hot ethyl acetate to yield 35.5 parts of crude 2,4-bis(di-2-hydroxyethylamino) - 6 - diethylamino-1,3,5-triazine which was purified by recrystallization in toluene.

EXAMPLE VI

At room temperature into a reaction vessel equipped as in Example IV was added with stirring a slurry of 16.4 parts (0.1 mole) of 2,4-dichloro-6-methyl-1,3,5-triazine in 100 parts of water to which was added dropwise 21 parts (0.2 mole) of diethanolamine. An aqueous solution of 10.6 parts (0.1 mole) of sodium carbonate in 30 parts of water was then added dropwise as hereinbefore described while slowly heating the product to reflux temperature (101° C.). The reaction mixture was then refluxed for two hours. Crude 2,4-bis(di-2-hydroxyethylamino)-6-methyl-1,3,5-triazine was crystallized. It was collected by filtration, dried and recrystallized from ethanol to yield 24.9 parts of pure product (melting point 136° C.–137° C.).

EXAMPLE VII

Example VI was repeated using 16.4 parts (0.1 mole) of 2,4-dichloro-6-methyl-1,3,5-triazine and 15 parts (0.2 mole) of N-methylethanolamine. Herein, though, after two hours at reflux, water was stripped out at reduced pressure and the residue was dissolved in ethanol to separate out the sodium chloride. Ethanol was then removed under reduced pressure and 24.9 parts of crude 2,4-bis(N-methyl-2-hydroxyethylamino)-6-methyl-1,3,5-triazine was recovered. The product was purified by distillation at 172° C. and at 0.2 mm. of mercury.

EXAMPLE VIII

A reaction vessel equipped as in Example I was charged with a slurry of 49.5 parts (0.3 mole) of 2-amino-4,6-dichloro-1,3,5-triazine in 300 parts of water. To the charge, 45.0 parts (0.6 mole) of N-methylethanolamine was added slowly. The mixture was slowly heated to reflux (101° C.). At reflux, 49 parts (0.6 mole) of sodium bicarbonate in 80 parts of water was added dropwise over a two-hour period. After the addition was completed, the contents of the vessel was cooled to room temperature and the white, solid product was collected by filtration and recrystallized in methanol. Fifty-nine parts of 2 - amino-4,6-bis(N-methyl-2-hydroxyethylamino)-1,3,5-triazine was thereby recovered.

EXAMPLE IX

Into a reaction vessel equipped as in Example I and containing a slurry of 54.0 parts (0.3 mole) of 2,4-dichloro-6-methoxy-1,3,5-triazine in 400 parts of water at about 7° C. was added dropwise, with stirring, 45 parts (0.6 mole) of N-methylethanolamine. After the addition was completed, the ice-bath was removed and the reaction mixture was allowed to warm to room temperature and 49 parts (0.6 mole) of solid sodium bicarbonate was added portionwise. After the addition was completed, the reaction mixture was heated at 80° C. for two hours, concentrated to one-half of its volume. The resulting viscous liquid was then dissolved in boiling ethyl acetate, dried with anhydrous magnesium sulfate and the ethyl acetate was evaporated at reduced pressure to yield 68 parts of crude 2,4 - bis(N - methyl-2-hydroxyethylamino)-6-methoxy-1,3,5-triazine. The crude product was then purified by dissolving it in methanol and passing it through alumina.

EXAMPLE X

At room temperature into a reaction vessel equipped as in Example I and containing a slurry of 351 parts (0.2 mole) of 2 - chloro - 4,6-dimethoxy-1,3,5-triazine in 200 parts of water was added dropwise, with stirring, 15 parts (0.2 mole) of N-methylethanolamine. After the amine was added, an aqueous solution of 21.2 parts (0.2 mole) of sodium carbonate in 60 parts of water was added over a period of one and one-fourth hours. The reaction mixture was then heated at 80° C. for three hours and, thereafter, allowed to cool to room temperature and 36.5 parts of crude crystalline 2,4 - dimethoxy - 6-(N-methyl-2-hydroxyethylamine)-1,3,5-triazine was recovered by filtration and drying. The crude product was then purified by recrystallization from a chloroform-petroleum ether mixture.

EXAMPLE XI

At room temperature into a reaction vessel equipped as in Example I and containing a slurry of 36.3 parts (0.15 mole) of 2,4-dichloro-6-phenoxy-1,3,5-triazine in 150 parts of water was added over a period of one hour, with stirring, 31.5 parts (0.3 mole) of diethanolamine. After the amine addition was completed, an aqueous solution of 15.9 parts (0.15 mole) of sodium carbonate in 45 parts of water was added at a rate sufficient to maintain the pH between seven and eight as the reaction mixture was slowly heated to reflux (101° C.). After the addition was completed, the contents of the vessel was refluxed for two hours. After reflux, the reaction mixture was allowed to cool to room temperature and the oily layer was separated out and crystallized with an ethyl ether-hexane mixture to yield 30 parts of 2,4-bis(di-2-hydroxyethylamino)-6-phenoxy-1,3,5-triazine.

EXAMPLE XII

Example XI was repeated using a slurry of 48.4 parts (0.2 mole) of 2,4-dichloro-6-phenoxy-1,3,5-triazine in 200 parts of water, 30 parts (0.4 mole) of N-methylethanolamine (added in one and one-half hours) and an aqueous solution of 21.2 parts (0.2 mole) of sodium carbonate dissolved in 60 parts of water. Herein, the crude product was recrystallized from petroleum ether to yield 51.8 parts of 2,4 - bis(N - methyl-2-hydroxyethylamino)-6-phenoxy-1,3,5-triazine.

EXAMPLE XIII

At room temperature and into a reaction vessel equipped as in Example I was added a slurry of 29.9 parts (0.1 mole) 2-chloro-4,6-diphenoxy-1,3,5-triazine in 150 parts of water. The slurry was then heated, with stirring, to 50° C. and 7.5 parts (0.1 mole) of N-methylethanolamine was added thereto dropwise over a ten-minute period. While continuing the stirring, the reaction mixture was heated to reflux (101° C.) and an aqueous solution of 4 parts of sodium hydroxide in 10 parts of water was added at a rate sufficient to keep the reaction mixture neutral. After the sodium hydroxide was added, the reaction mixture was refluxed for five hours. It was then cooled to room temperature and the solid, crystalline product was collected by filtration, washed with dilute sodium hydroxide, then with water and dried to a yield of 25 parts of 2,4-diphenoxy-6-(N-methyl-2-hydroxyethylamino)-1,3,5-triazine which was then recrystallized from benzene.

EXAMPLE XIV

A reaction vessel equipped as in Example I was charged with a slurry of 24 parts (0.08 mole) of 2-chloro-4,6-diphenoxy-1,3,5-triazine in 150 parts of water. With stirring 8.5 parts (0.081 mole) of diethanolamine was added dropwise thereto and the resulting mixture was heated to reflux (101° C.). Upon reaching reflux, an aqueous solution of 3.2 parts (0.08 mole) of sodium hydroxide in 10 parts of water was added to the vessel at a rate sufficient to keep the reaction mixture neutral. After the hydroxide addition was completed, the content of the reaction vessel was then refluxed for 4 hours, and then allowed to cool to room temperature. The white, crystalline solid precipitate was then recovered by filtration and dried to a yield of 24.2 parts of 2,4- diphenoxy - 6 - (di-2-hydroxyethylamino)-1,3,5-triazine which was then recrystallized from benzene to purify the product.

The following examples illustrate the preparation of cellular foams using the catalysts of the previous examples.

EXAMPLE XV

The catalysts described in Examples I–XIV were used to prepare rigid cellular foams characterized by carbodiimide, isocyanurate and isocyanate linkages. The procedure used to prepare the foam comprised heating a mixture of organic polyisocyanate and triazine to the initiation temperature at which point a sudden exotherm develops, followed shortly thereafter by the evolution of carbon dioxide and the formation of a foam. To accommodate the volume of foam produced hereby when the initiation temperature was reached, the reactants were transferred to a new container sufficiently large to accommodate the foam volume.

The following table, Table I, sets forth the ingredients used to prepare the foam as well as the initiation temperature and maximum exotherm temperature. Examination of the infrared spectrum of all the foams prepared indicated the presence of carbodiimide, isocyanurate and isocyanate groups.

TABLE I

| Catalyst, p.b.w. | | Isocyanate amt., p.b.w. | | | Initial temp., °C. | Maximum exotherm temp., °C. |
|---|---|---|---|---|---|---|
| Type | Amt. | TDI[1] | MDI[2] | CMDI[3] | | |
| Example: | | | | | | |
| I | 1.0 | 100 | | | 124 | 185 |
| I | 5.0 | | | 100 | 152 | 220 |
| I | 2.0 | | 100 | | 110 | 175 |
| I | 3.0 | 50 | | 50 | 140 | 182 |
| I | 5.0 | | 100 | | 100 | 180 |
| I | 2.0 | | 100 | | 108 | 165 |
| I | 3.0 | 50 | | 50 | 138 | 192 |
| II | 1.0 | 100 | | | 123 | 186 |
| III | 1.0 | 100 | | | 134 | 195 |
| III | 5.0 | | | 100 | 156 | |
| III | 3.0 | 50 | | 50 | 144 | 237 |
| IV | 1.0 | 100 | | | 117 | 174 |
| IV | 3.0 | 50 | | 50 | 137 | 147 |
| IV | 5.0 | | | 100 | 153 | |
| V | 1.0 | 100 | | | 123 | 181 |
| V | 4.0 | | 100 | | 120 | 225 |
| V | 3.0 | | 50 | 50 | 154 | 180 |
| VI | 1.0 | 100 | | | 148 | 200 |
| VII | 1.0 | 100 | | | 140 | 200 |
| VIII | 2.0 | 100 | | | 154 | 230 |
| IX | 1.0 | 100 | | | 122 | 190 |
| IX | 3.0 | 50 | | 50 | 125 | 202 |
| XI | 1.0 | 100 | | | 113 | 210 |
| XI | 3.0 | 50 | | 50 | 140 | 246 |
| XI | 4.0 | 50 | | 50 | 136 | |
| XII | 1.0 | 100 | | | 123 | 191 |
| XIII | 5.0 | 100 | | | 135 | 190 |
| XIV | 4.0 | 100 | | | 168 | 230 |
| 2,4-bis(di-2-hydroxyethylamino)-6-chloro-1,3,5-triazine | 1.0 | 100 | | | 165 | 224 |
| 2,4-bis(N-methyl-2-hydroxyethylamino)-6-hydroxy-1,3,5-triazine | 1.0 | 100 | | | 125 | 180 |

[1] An 80:20 weight mixture of 2,4- and 2,6-toluene diisocyanate.
[2] Methylene diphenyl diisocyanate.
[3] Crude methylene diphenyl diisocyanate.

EXAMPLE XVI

A series of carbodiimide foams were prepared by condensing an organic polyisocyanate in the presence of a catalyst consisting essentially of an unsymmetrically substituted triazine in accordance with the present invention and an isocyanate trimerization catalyst, 1,3,5-tris(N,N-dimethyl-3-aminopropyl)-s-hexahydrotriazine. The procedure employed comprised blending the catalyst with the organic polyisocyanate and vigorously stirring the mixture at room temperature or while heating it to initiation temperature.

In preparing these foams, 15 parts of a fluorocarbon blowing agent, 1,1,2 - trifluoro-1,2,2-trichloroethane, was premixed with the isocyanate prior to mixing the catalyst therewith. Also, the catalyst had premixed, therewith, a plasticizer, tris(2 - chloroethyl)phosphate, and a polysiloxane surfactant sold by Dow Corning under the name DC–193, to facilitate their introduction. Although only the triazine and trimerization compound comprise the catalyst since the other ingredients are premixed therewith, for brevity the mixture collectively will be referred to as catalyst.

CATALYST 1

Ingredient: Amount, p.b.w.
    Triazine of Example I _____ 1.5
    Trimerization catalyst _____ 0.75
    Surfactant _____ 1.50
    Plasticizer _____ 1.00

The four ingredients were mixed together at room temperature to give a clear solution.

CATALYST 2

Ingredient: Amount, p.b.w.
    Triazine of Example II _____ 1.50
    Trimerization catalyst _____ 0.75
    Plasticizer _____ 1.00
    Surfactant _____ 0.50
    Dipropylene glycol, as solvent for triazine ____ 6.50

This catalyst was prepared by mixing the ingredients together at room temperature and then, with stirring, heating the mixture to about 60° C. to 70° C. and thereafter allowing the mixture to cool to room temperature.

CATALYST 3

| Ingredient: | Amount, p.b.w. |
|---|---|
| Triazine of Example IV | 1.50 |
| Trimerization catalyst | 0.75 |
| Surfactant | 0.50 |
| Plasticizer | 1.00 |

This catalyst was prepared by mixing the ingredients together at room temperature to obtain a clear solution.

CATALYST 4

| Ingredient: | Amount, p.b.w. |
|---|---|
| Triazine of Example IX | 1.50 |
| Trimerization catalyst | 0.75 |
| Plasticizer | 1.00 |
| Surfactant | 0.50 |

This catalyst was prepared by mixing the ingredients together at room temperature to provide a clear solution.

Table II, below, sets forth some of the physical parameters observed while making the foams from the catalyst.

ethylamino) - 6 - (N - methyl - 2 - hydroxyethylamino)-1,3,5-triazine.

The embodiments of the invention in which an exclusive property or privilege is claimed are defined as follows:

1. A process for the preparation of a rigid cellular foam comprising condensing an organic polyisocyanate in the presence of a catalytically sufficient amount of an unsymmetrically substituted triazine corresponding to the formula:

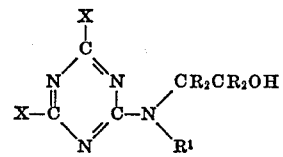

wherein R is hydrogen or lower alkyl of from 1 to 10 carbon atoms, $R^1$ is $CR_2CR_2OH$ or lower alkyl of from 1 to 12 carbon atoms and X is $NR_2$,

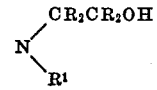

TABLE II

| Isocyanate reactant, amt. | | Catalyst, amt. | Catalyst 1 | | | Catalyst 2 | | | Catalyst 3 | | | Catalyst 4 | | |
|---|---|---|---|---|---|---|---|---|---|---|---|---|---|---|
| CMDI a | TDI b | | Cream time, sec. | Rise time, sec. | Max. exotherm, °C. | Cream time, sec. | Rise time, sec. | Max. exotherm, °C. | Cream time, sec. | Rise time, sec. | Max. exotherm, °C. | Cream time, sec. | Rise time, sec. | Max. exotherm, °C. |
| 100 | | 7.0 | 145 | 240 | 130 | 120 | 235 | 125 | 140 | 200 | 120 | 135 | 240 | 126 |
| 90 | 10 | 5.5 | 110 | 210 | 138 | 100 | 195 | 136 | 100 | 190 | 126 | 100 | 200 | 134 |
| 80 | 20 | 6.0 | 90 | 165 | 135 | 86 | 150 | 141 | 90 | 160 | 133 | 85 | 170 | 142 |
| 70 | 30 | 5.5 | 70 | 140 | 145 | 72 | 140 | 147 | 66 | 130 | 142 | 65 | 125 | 147 | a Crude methylene diphenyl diisocyanate.
b An 80:20 weight mixture of 2,4- and 2,6-toluene diisocyanate.

EXAMPLE XVII

The four foams prepared in Example XVI from Catalyst 1, hereafter referred to as Foams A–D, were tested for properties in accordance with the following procedure. Foam A was prepared from 100 parts of crude methylene diphenyl diisocyanate and 7 parts of Catalyst 1 whereas Foam D was prepared from 70 parts of crude methylene diphenyl diisocyanate and 30 parts of toluene diisocyanate and 5.5 parts of Catalyst 1. Foams A–D are described in Table II.

| Property: | Test |
|---|---|
| Compressive strength, 10% deflection, p.s.i. | ASTM D-1621. |
| Taber | Carlos J. Hilado, Friability Test for Rigid Cellular Plastics, Journal of Cellular Plastics, vol. 5, No. 1, pp. 55–58 (1969). |
| Tumbling friability, percent weight loss | ASTM C-421. |
| Butler chimney | ASTM D-3014. |

The following table, Table III, shows the results of these tests:

alkoxy of from 1 to 12 carbon atoms, phenoxy, alkyl of from 1 to 12 carbon atoms, phenyl, hydroxyl, halogen, aziridyl, pyrrolidyl, piperidyl, or N-alkylpiperazyl having from 1 to 12 carbon atoms in the alkyl chain, wherein R and $R^1$ are as defined above with the proviso that each X cannot be

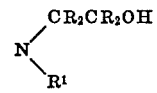

wherein each R and $R^1$ is the same.

2. The process of claim 1 wherein the catalyst is used in amount ranging from about 0.1 part to 20 parts by weight thereof per 100 parts by weight of organic polyisocyanate.

3. The process of claim 2 wherein the catalyst is used in amount ranging from about 0.5 part to 5 parts by weight thereof per 100 parts by weight of organic polyisocyanate.

4. The process of claim 1 wherein the catalyst is employed in admixture with an isocyanate trimerization catalyst.

5. The process of claim 4 wherein the catalyst and isocyanate trimerization catalyst are used in a respective weight ratio of from about 0.1:10 to 10:0.1.

TABLE III

| Foam | Density, p.s.i. | Compressive strength, 10% deflection, p.s.i. | Taber friability, cycles/in. | Tumbling friability, percent wt. loss | Closed cell content, percent | Butler chimney test | | |
|---|---|---|---|---|---|---|---|---|
| | | | | | | Percent weight retention | Flame height, inches | Smoke |
| A | 2.93 | 53 | 123 | 52 | 99 | 97 | 3+ | Light. |
| B | 2.71 | 41 | 79 | 64 | 99 | 97 | 4 | Do. |
| C | 2.37 | 32 | 62 | 75 | 99 | 96 | 4 | Do. |
| D | 2.01 | 23 | 43 | 84 | 98 | 95 | 4+ | Do. |

These results were found to be comparable to analogous foams prepared from like ingredients and amounts substituting 2,4,6 - tris(N-methylethanolamino)-s-triazine as the primary catalyst in lieu of the present 2,4-bis(di- 6. The process of claim 5 wherein the catalyst and isocyanate trimerization catalyst are present in a respective weight ratio of from about 1:4 to 4:1.

7. The process of claim 5 wherein the catalyst and isocyanate trimerization catalyst are employed in amount ranging from about 1 part to 10 parts by weight thereof per 100 parts by weight of organic polyisocyanate.

8. The process of claim 4 wherein the isocyanate trimerization catalyst is selected from the group consisting of a 1,3,5 - tris(N,N - dialkylaminoalkyl)-s-hexahydrotriazine, an alkylene oxide and water adduct of a 1,3,5-tris(N,N - dialkylaminoalkyl) - s - hexahydrotriazine, 2,4,6 - tris(dimethylaminomethyl)phenol, o-, p- or a mixture of o- and p-(dimethylaminomethyl)phenol, and an organotin compound.

9. The process of claim 8 wherein the isocyanate trimerization catalyst is 1,3,5 - tris(N,N-dimethyl-3-aminopropyl)-s-hexahydrotriazine.

10. The process of claim 1 wherein R is hydrogen, $R^1$ is methyl and each X is $NR_2$ wherein R is ethyl.

11. The process of claim 1 wherein R is hydrogen, $R^1$ is methyl and each X is $NR_2$ wherein R is methyl.

12. The process of claim 1 wherein R is hydrogen, $R^1$ is methyl, one X is

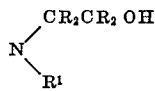

and the other X is $NR_2$ wherein R is ethyl.

13. The process of claim 1 wherein R is hydrogen, $R^1$ is methyl, one X is

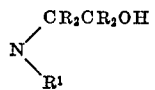

and the other X is methoxy.

14. The process of claim 8 wherein R is hydrogen, $R^1$ is methyl and each X is $NR_2$ wherein R is ethyl.

15. The process of claim 8 wherein R is hydrogen, $R^1$ is methyl and each X is $NR_2$ wherein R is methyl.

16. The process of claim 8 wherein R is hydrogen, $R^1$ is methyl, one X is

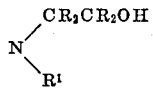

and the other X is $NR_2$ wherein R is ethyl.

17. The process of claim 8 wherein R is hydrogen, $R^1$ is methyl, one X is

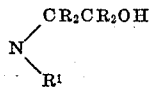

and the other X is methoxy.

References Cited
UNITED STATES PATENTS

| | | | | |
|---|---|---|---|---|
| 3,645,923 | 2/1972 | Kan | 260— | 2.5 BF |
| 3,717,596 | 2/1973 | Kan | 260— | 2.5 BF |
| 3,723,366 | 3/1973 | Kan | 260— | 2.5 BF |

DONALD E. CZAJA, Primary Examiner

C. W. IVY, Assistant Examiner

U.S. Cl. X.R.

260—2.5 AC, 2.5 AW, 551 CD, 566 R